(12) United States Patent
Yang

(10) Patent No.: US 12,407,021 B2
(45) Date of Patent: Sep. 2, 2025

(54) COMPOSITE BATTERY CELL

(71) Applicants: PROLOGIUM TECHNOLOGY CO., LTD., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 0 days.

(21) Appl. No.: 17/880,067

(22) Filed: Aug. 3, 2022

(65) Prior Publication Data

US 2022/0376359 A1    Nov. 24, 2022

Related U.S. Application Data

(62) Division of application No. 16/135,519, filed on Sep. 19, 2018, now Pat. No. 11,444,359.

(30) Foreign Application Priority Data

Oct. 20, 2017 (TW) .................. 106136071

(51) Int. Cl.
*H01M 50/502* (2021.01)
*H01M 4/62* (2006.01)
(Continued)

(52) U.S. Cl.
CPC ......... *H01M 10/0565* (2013.01); *H01M 4/62* (2013.01); *H01M 10/0413* (2013.01); *H01M 10/0562* (2013.01); *H01M 10/0563* (2013.01); *H01M 10/425* (2013.01); *H01M 50/105* (2021.01); *H01M 50/186* (2021.01); *H01M 50/191* (2021.01); *H01M 50/197* (2021.01); *H01M 50/461* (2021.01);
(Continued)

(58) Field of Classification Search
CPC ......... H01M 10/0413; H01M 10/0562; H01M 10/0563; H01M 10/0565; H01M 10/425; H01M 2220/20; H01M 2300/0082; H01M 4/62; H01M 50/105; H01M 50/186; H01M 50/191; H01M 50/197; H01M 50/461; H01M 50/533; H01M 50/545; Y02E 60/10
See application file for complete search history.

(56) References Cited

U.S. PATENT DOCUMENTS

| | | |
|---|---|---|
| 3,844,841 A | 10/1974 | Baker |
| 5,264,306 A | 11/1993 | Walker, Jr. et al. |

(Continued)

*Primary Examiner* — Lingwen R Zeng
(74) *Attorney, Agent, or Firm* — RABIN & BERDO, P.C.

(57) ABSTRACT

A composite battery cell includes a plurality of electricity supply elements connected to each other in series/parallel to form the electricity supply element groups. The electricity supply element groups are connected to each other in parallel/series and packed to form the battery cell with high capacity and high voltage. Each electricity supply element is an in-dependent module and the electrolyte system does not circulate therebetween. There only have charges transferred rather than electrochemical reactions between the adjacent electricity supply elements. Therefore, the electrolyte decomposition would not occur result from the high voltage caused by connecting in series. Both series and parallel connection are made within the package of the battery cell to achieve high capacity and high voltage.

11 Claims, 11 Drawing Sheets

(51) Int. Cl.
    *H01M 10/04* (2006.01)
    *H01M 10/0562* (2010.01)
    *H01M 10/0563* (2010.01)
    *H01M 10/0565* (2010.01)
    *H01M 10/42* (2006.01)
    *H01M 50/10* (2021.01)
    *H01M 50/105* (2021.01)
    *H01M 50/183* (2021.01)
    *H01M 50/186* (2021.01)
    *H01M 50/191* (2021.01)
    *H01M 50/197* (2021.01)
    *H01M 50/20* (2021.01)
    *H01M 50/46* (2021.01)
    *H01M 50/533* (2021.01)
    *H01M 50/545* (2021.01)

(52) U.S. Cl.
    CPC ....... *H01M 50/533* (2021.01); *H01M 50/545* (2021.01); *H01M 2220/20* (2013.01); *H01M 2300/0082* (2013.01); *Y02E 60/10* (2013.01)

(56) References Cited

U.S. PATENT DOCUMENTS

| | | | |
|---|---|---|---|
| 7,659,030 | B2 | 2/2010 | Watanabe et al. |
| 9,520,580 | B2 | 12/2016 | Sayre et al. |
| 10,283,774 | B2 | 5/2019 | Sato et al. |
| 11,043,703 | B1 | 6/2021 | Zeng et al. |
| 2004/0091771 | A1 | 5/2004 | Hosaka et al. |
| 2004/0106038 | A1* | 6/2004 | Shimamura ......... H01M 50/105 |
| | | | 29/623.2 |
| 2006/0216577 | A1 | 9/2006 | Cheng |
| 2008/0083113 | A1 | 4/2008 | Hong |
| 2009/0029253 | A1* | 1/2009 | Itou .................. H01M 10/0525 |
| | | | 429/223 |
| 2010/0025132 | A1* | 2/2010 | Hill ........................ B62D 29/02 |
| | | | 180/68.5 |
| 2014/0272508 | A1 | 9/2014 | Musetti |
| 2015/0140371 | A1 | 5/2015 | Slocum |
| 2017/0373300 | A1 | 12/2017 | Maeda et al. |
| 2019/0088984 | A1 | 3/2019 | Takami et al. |

\* cited by examiner

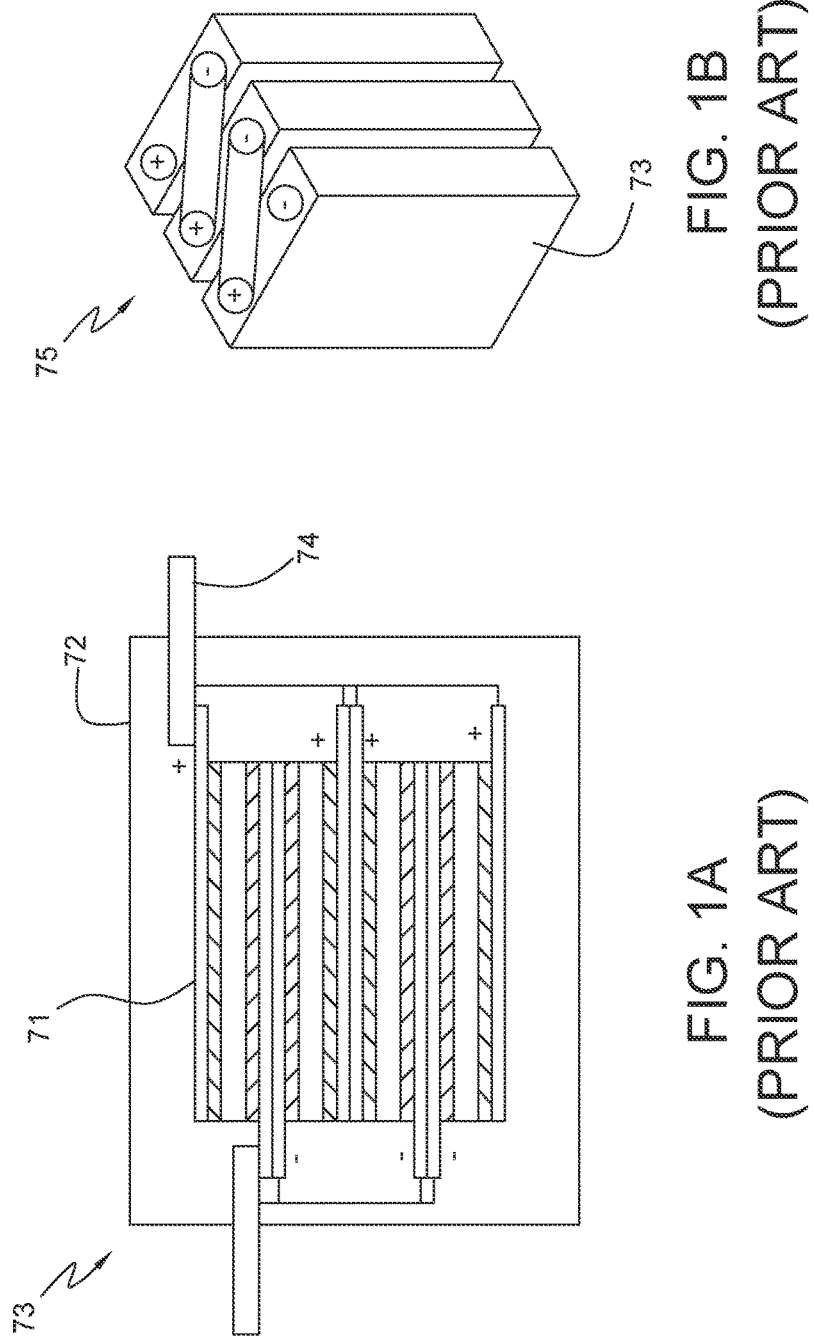

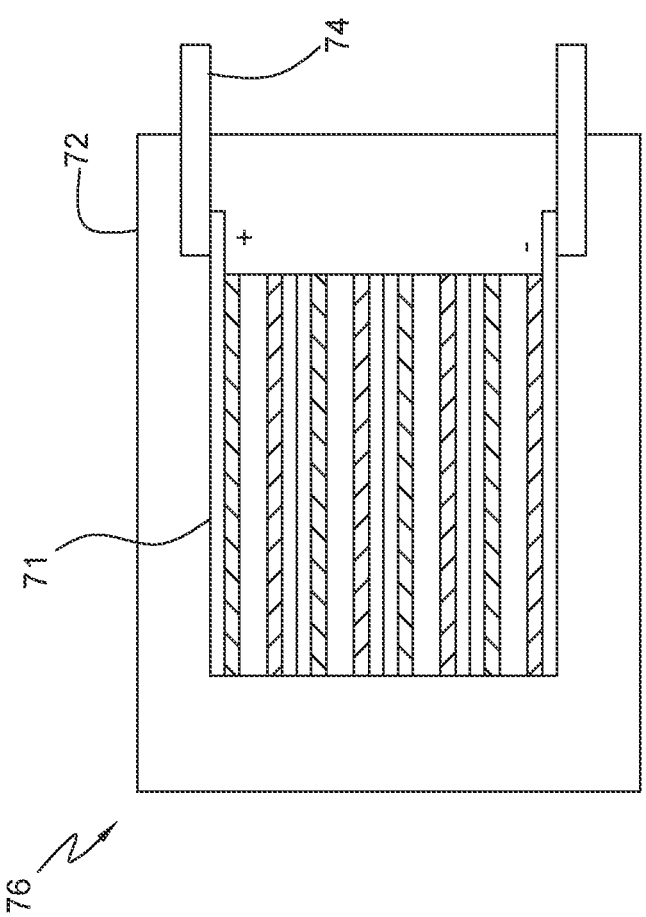
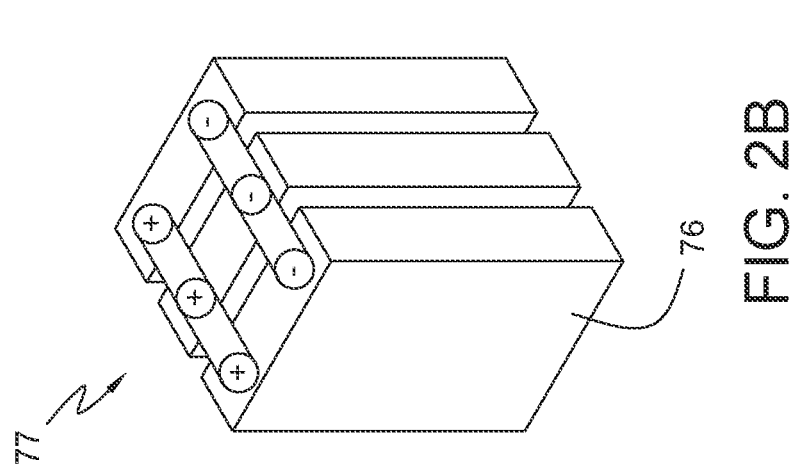
FIG. 2A (PRIOR ART)
FIG. 2B (PRIOR ART)

COMPOSITE BATTERY CELL

CROSS REFERENCES TO RELATED APPLICATIONS

This application is a division of U.S. application Ser. No. 16/135,519, filed on Sep. 19, 2018, and is based upon and claims priority to Taiwanese Patent Application 106136071 filed in the Taiwanese Patent Office on Oct. 20, 2017, the entire contents of which is being incorporated herein by reference.

BACKGROUND OF THE INVENTION

Field of Invention

The present invention relates to a battery cell, in particular to a composite battery cell formed by independent modular electricity supply elements, for which both series and parallel connection are made within the package of the battery cell to achieve high capacity and high voltage.

Related Art

In recent years, with the increase of air pollution and global warming, electric vehicles have been given high expectations to replace existing combustible fuel vehicles to reduce the environmentally harmful effects of carbon dioxide. At present, the battery system is still the key point of the pure electric vehicles. The battery system for the electric vehicles is formed by several battery cells, connected to each other in series, in parallel or the combinations to achieve necessary capacity and voltage for the electric vehicles.

Please refer to FIGS. 1A and 1B, which show that, as the most common practice, a plurality of battery elements 71 are connected to each other in parallel. A case 72 is used to pack the battery elements 71 to form the battery cell 73. The conductive lead 74 is exposed from the case 72. The conductive leads 74 of multiple battery cells 73 are externally connected in series to achieve a high enough voltage to form the battery system 75 for the electric vehicles. An alternative method is using the case 72 to house a plurality of battery elements 71. The electrolyte is filled within the case 72. Please see FIGS. 2A and 2B, which shows that the battery elements 71 are internally connected to each other in series to increase the voltage. The conductive lead 74 is used to be externally connected in parallel to achieve enough capacity to form the battery system 77 for the electric vehicles. However, the maximum permissible voltage of the electrolyte is usually 5V only. The voltage is increased, as a result from the battery elements 71 internally connected in series. And, the electric field distribution is not uniform due to the internal structure and arrangement. Once the voltage is over the maximum permissible voltage, the electrolyte decomposition would occur to cause the battery system 77 to fail. More seriously, it may cause the battery system 77 to explode. Therefore, there are no such products on the market.

The US patent application NO. 2004/0091771 provides that a common current collector is used by two adjacent cells to form a bipolar battery to overcome the problem of the electrolyte decomposition. The design lacks flexibility due to the connection in series with the common current collector. It only can be applied in internal serial connection. Also, the external connection is needed to connect a plurality of bipolar batteries in parallel to form the assembled battery system.

Regardless of the above method, the capacity and voltage are limited by the structural problems of the battery cell and the internal battery unit. The external connection in series is necessary to achieve enough voltage to form the battery system when the connection in parallel within the battery cell is adapted. Also, the external connection in parallel is necessary to achieve enough high capacity to form the battery system when the connection in series within the battery cell is adapted. The external connection usually uses wire bonding, the metal lead, or the metal bar, which may increase the resistance of the battery system and lower the performance, and may reduce reliability and safety. Moreover, the volumetric energy density would be decreased due to the space occupied by the external connection.

SUMMARY OF THE INVENTION

It is an objective of this invention to provide a composite battery cell to overcome the forgoing shortcomings. Both series and parallel connection are made within the package of the battery cell to achieve a high capacity and a high voltage. Therefore, the shortcomings of the conventional battery system, such as low performance and decreased volumetric energy density caused by the external connection, can be eliminated.

Also, it is another objective of this invention to provide a composite battery cell composed of electricity supply elements. Charge transfer occurs between the adjacent electricity supply elements without electrochemical reactions. The composite battery cell can be formed by the electricity supply elements electrically connected to each other both in series and in parallel. Therefore, high voltage is achieved without being limited by the maximum permissible voltage of the electrolyte system to increase volumetric energy density and voltage.

In order to implement the abovementioned, this invention discloses a composite battery cell, which includes a plurality of electricity supply element groups. The electricity supply element groups are connected to each other in parallel/series and packed by a pack case to form the composite battery cell. Each electricity supply element group is formed by a plurality of electricity supply elements connected to each other in series/parallel. And the electricity supply element includes a separator, two active material layers, two current collectors, the electrolyte system and a sealing layer. The active material layers are disposed on the two sides of the separator, respectively, and the current collectors are disposed on outer sides of the active material layers, respectively. The electrolyte system is impregnated within the active material layers, and the sealing layer is disposed between the edges of the two current collectors to adhere to the two current collectors and seal the electrolyte system therebetween. Each electricity supply element is an independent module and the electrolyte system does not circulate therebetween. There only are charges transferred rather than electrochemical reactions between the adjacent electricity supply elements. Therefore, both series and parallel connection could be made within the package of the battery cell without being limited by the maximum permissible voltage of the electrolyte system.

On the other hand, the electricity supply elements are connected to each other via the current collectors, and the electricity supply element groups are connected to each other via the current collectors. The contact area therebetween is much larger than the contact area of conventional method, such as wire bonding. Therefore, the internal resistance of the battery cell is greatly reduced. The performance loss of the battery cell almost can be ignored, and the performance of the battery cell can be deemed not declined. Also, because the internal resistance is very low, excellent charging/discharging speed efficiency and low heat generation are achieved. Therefore, heat dissipation mechanism can be simplified. The whole system is easy to manage and control, and reliability and safety are improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIGS. 1A and 1B illustrate a first conventional battery cell and battery system.

FIGS. 2A and 2B illustrate a second conventional battery cell and battery system.

DETAILED DESCRIPTION OF THE INVENTION

The invention provides a composite battery cell including a plurality of electricity supply element groups electrically connected to each other in parallel or in series. Each electricity supply element group includes a plurality of electricity supply elements electrically connected to each other in series or in parallel. Therefore, both series and parallel connection are made within the package of the battery cell. It is quite different from conventional battery cells, which only have either series or parallel connection within the package, and have parallel or series connection outside the battery cell to form necessary battery system.

Moreover, the electricity supply element of the present invention serves as an independent module. The electrolyte system of each electricity supply element does not circulate between the electricity supply elements.

Figure 3:
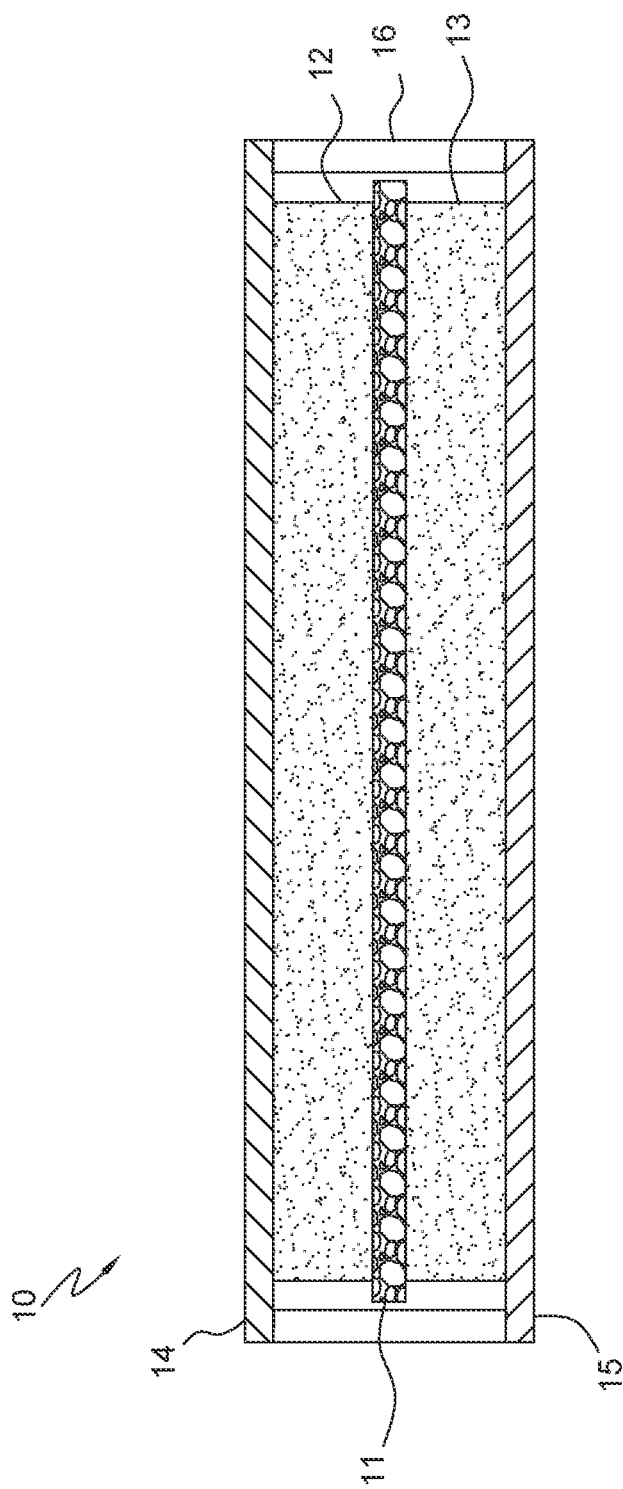
FIG. 3 illustrates the cross-sectional view of the electricity supply element of the composite battery cell of this invention.
Figure 4:
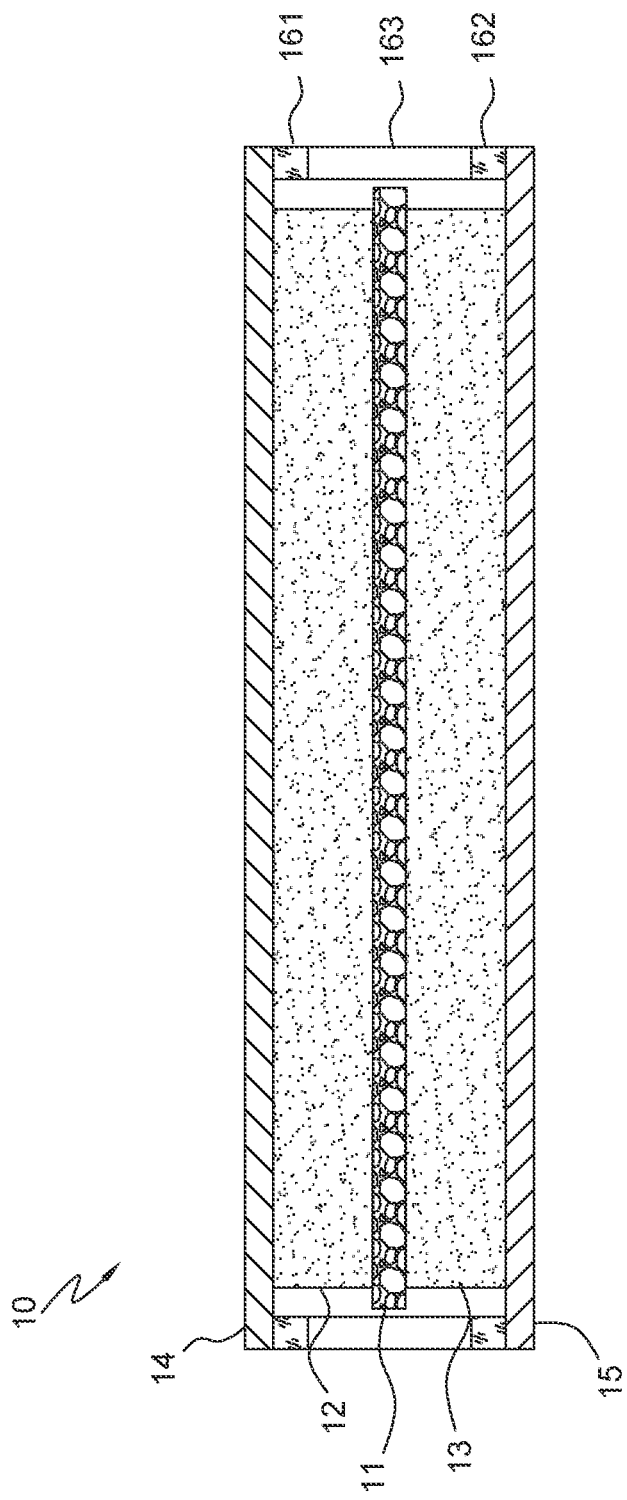
FIG. 4 illustrates the cross-sectional view of another embodiment of the sealing layer of the electricity supply element of the composite battery cell of this invention.

FIG. 3 illustrates the cross-sectional view of the electricity supply element of the composite battery cell of this invention. The electricity supply element 10 of this invention includes a separator 11, two active material layers 12, 13, two current collectors 14, 15, an electrolyte system, and a sealing layer 16. The materials of the separator 11 include polymers, ceramics or glass fibers. Also, the separator 11 has holes to permit ion migration. The holes are formed by through holes, ant holes, or porous material, and may be further filled with ceramic insulation materials. The ceramic insulation materials include particles of $TiO_2$, $Al_2O_3$, $SiO_2$ with a nanometer or micrometer scale, or alkylation. The holes may be further filled with a polymer adhesive, which may be Polyvinylidene fluoride (PVDF), polyvinylidene fluoride co-hexafluoropropylene (PVDF-HFP), Polytetrafluoroethene (PTFE), acrylic acid glue, epoxy resin, polyethylene oxide (PEO), polyacrylonitrile (PAN), and polyimide (PI).

The active material layers 12, 13 are disposed on two sides of the separator 11 respectively, and the electrolyte system is impregnated therein. The electrolyte system is a solid electrolyte, a liquid electrolyte, a gelled electrolyte, or the combination thereof. Therefore, the processes in which the chemical energy is converted into electrical energy, or discharging, and in which the electrical energy is converted into chemical energy, or charging, may be carried out. Ion migration and transport are achieved. The electric charges are transmitted via the current collectors 14, 15, which are disposed on outer sides of the active material layers 12, 13, respectively. The materials of the current collectors 14, 15 are copper (Cu), Aluminum (Al), or nickel (Ni), tin (Sn), silver (Ag), gold (Au), or an alloy comprised of at least one of the foregoing metals.

The materials of the sealing layer 16 include the epoxy, Polyethylene (PE), Polypropylene (PP), Polyurethane (PU), thermoplastic polyimide (TPI), silicone, acrylic resin and/or ultraviolet light curing adhesive. The sealing layer 16 is disposed between the edges of the two current collectors 14, 15 to adhere to the two current collectors 14, 15 and seal the electrolyte system therebetween to avoid leakage and prevent to circulate between adjacent electricity supply elements 10. Therefore, the electricity supply element 10 serves as an independent, sealed and complete module, which can generate power independently.

To enhance adhesion of the sealing layer 16, the sealing layer 16 may including two modified silicone layers 161, 162 and a silicone layer 163 disposed between the two modified silicone layers 161, 162. The modified silicone layers 161, 162 may be modified by adjusting a proportion of condensation-type silicone and addition-type silicone to enhance adhesion of different materials, i.e. the materials of the current collectors 14, 15 and the silicone layer 163. Therefore, the adhesion between the interfaces of the current collectors 14, 15 and the sealing layer 16 is enhanced. The overall appearance is more complete and the production yield is improved. Also, because the sealing layer 16 is made of silicone, moisture can be blocked from the outside, and the polar solvent and the complexing agent can be blocked from the inside, to make the package structure more complete.

The electricity supply element group includes a plurality of electricity supply elements 10 electrically connected to each other. Please refer to FIG. 5A, which illustrates a first embodiment of the electricity supply element group of the composite battery cell of this invention.

Figure 5A:
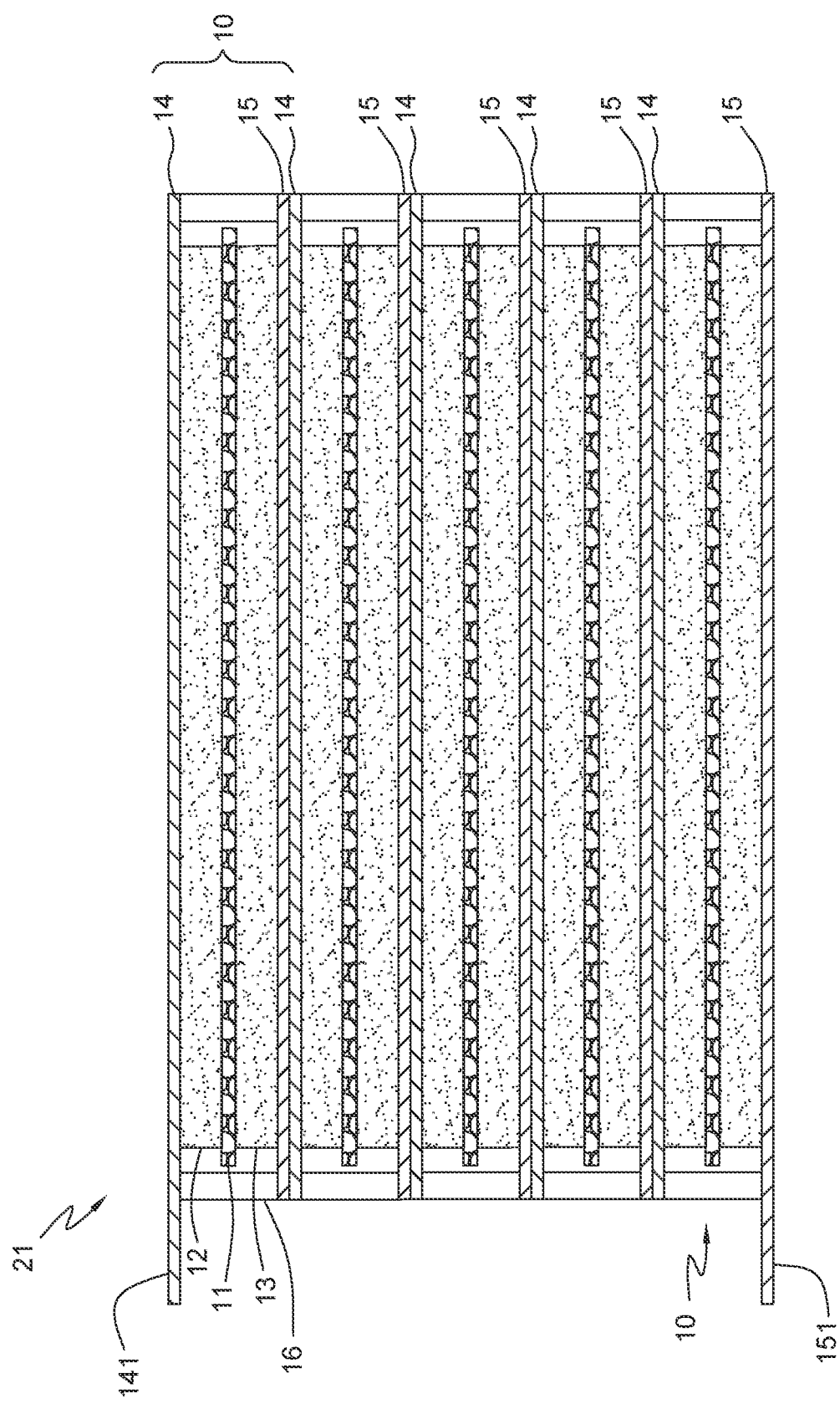
FIG. 5A illustrates the first embodiment of the electricity supply element group of the composite battery cell of this invention.

The electricity supply element group 21 includes a plurality of electricity supply elements 10 electrically connected to each other in series. Because the outermost layer of the electricity supply elements 10 is the current collectors 14, 15, the adjacent electricity supply elements may form electrically connection by direct contact, such as by overlapping, of the current collectors 14, 15. The current collectors 14, 15 with different polarities are contacted to form the electrical connection in series. For example, as shown in FIG. 5A, when the current collector 14 is a positive current collector and the current collector 15 is a negative current collector, the current collector 15 of the outermost electricity supply elements 10 can directly contact the current collector 14 of the next electricity supply elements 10. Also, the current collector 15 of this electricity supply elements 10 can directly contact the current collector 14 of the next electricity supply elements 10, sequentially. Therefore, the electricity supply element group 21 with the electricity supply elements 10 electrically connected to each other in series can be formed. The electricity supply element 10 serves as an independent module. The electrolyte system of each electricity supply element 10 does not circulate between the electricity supply elements 10. Therefore, charge transfer occurs between the current collectors 14, 15 of the adjacent electricity supply elements without electrochemical reactions, i.e. without ion migration and transport. The high voltage caused by the electricity supply elements 10 connected in series does not affect the electrolyte system inside the individual electricity supply elements 10. The voltage that affects the electrolyte system is only the individual voltage inside the electricity supply elements 10. Hence, the electricity supply element group 21 could be formed by the electricity supply elements 10 electrically connected to each other in series to achieve high voltage without being limited by the maximum permissible voltage of the electrolyte system, which is usually 5V.

Then, the electricity supply element groups 21 with the electricity supply elements 10 electrically connected to each other in series, may be connected to each other to form a composite battery cell or an external connection, which is described later in detail. The outer current collectors 14, 15 of the outermost electricity supply element 10 include electrode tabs 141, 151 respectively. In other words, the current collector 14 of the uppermost electricity supply element 10 has the electrode tab 141, and the current collector 15 of the lowermost electricity supply element 10 has the electrode tab 145, as shown in FIG. 5A. The other current collectors may not include the electrode tabs.

Figure 6A:
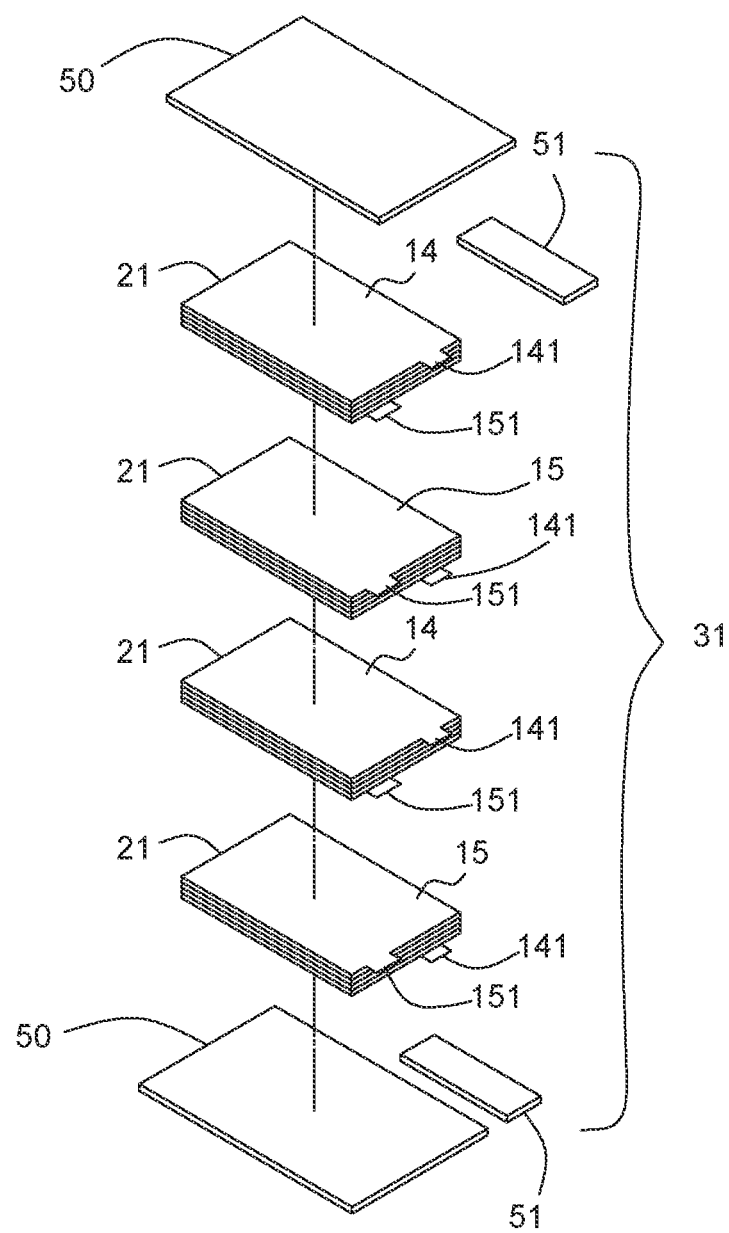
FIG. 6A illustrates the first embodiment of the composite battery cell of this invention.
Figure 7:
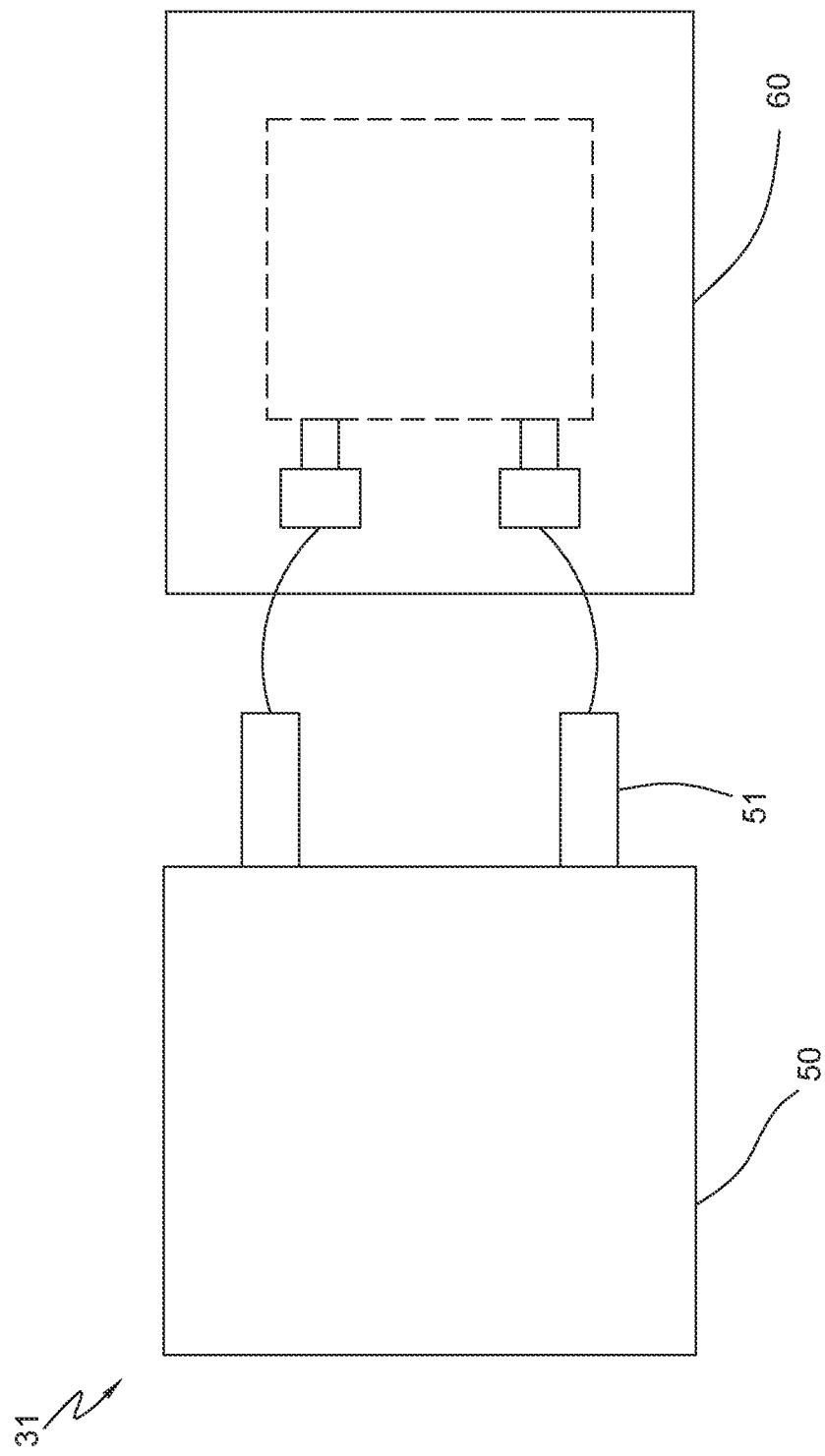
FIG. 7 illustrates the respective view of the composite battery cell of this invention, which is connected to a PCB module.

Please refer to FIG. 6A, which shows that a composite battery cell 31 is formed by the electricity supply element groups 21, which is shown in FIG. 5A. Because the electricity supply element group 21 with the electricity supply elements 10 are electrically connected to each other in series, the composite battery cell 31 of this embodiment includes a plurality of electricity supply element groups 21 electrically connected in parallel. In other words, the electricity supply element groups 21 are inverted alternately face-up and face-down to stack. The current collectors 14, 15 of the outermost electricity supply elements 10 directly contact each other to achieve electrical connection, and the electrode tabs 141, 151 with the same polarity of the electricity supply element groups 21 are connected to a corresponding conductive lead 51. The pack case 50 is used to house the electricity supply element groups 21. The pack case 50 may be a polymer film to prevent short circuit. Also, the pack case 50 may be an aluminum foil or a metal can. After being packed, the conductive lead 51 extends to be exposed from the pack case 50 (please refer to FIG. 7). A printed circuit board (PCB) module 60 may be used and be connected to the conductive lead 51 for management and supply. The shape and the form of the pack case 50 are illustrated in FIG. 7. Other forms, such as bags or boxes, may also be applied.

Therefore, both series and parallel connection are made within the package, i.e., the pack case 50, of the composite battery cell 31 to achieve high capacity and high voltage. It is quite different from the conventional battery cell, as shown in FIGS. 2A and 2B, which can only have series connection within the package and parallel connection outside the battery cell to form the necessary battery system. On the other hand, the composite battery cell 31 of the present invention may almost serve the same functions of the conventional battery system. However, because the external connections are omitted, the occupied space is decreased and the volumetric energy density is increased. Furthermore, it is convenient to manage.

Figure 5B:
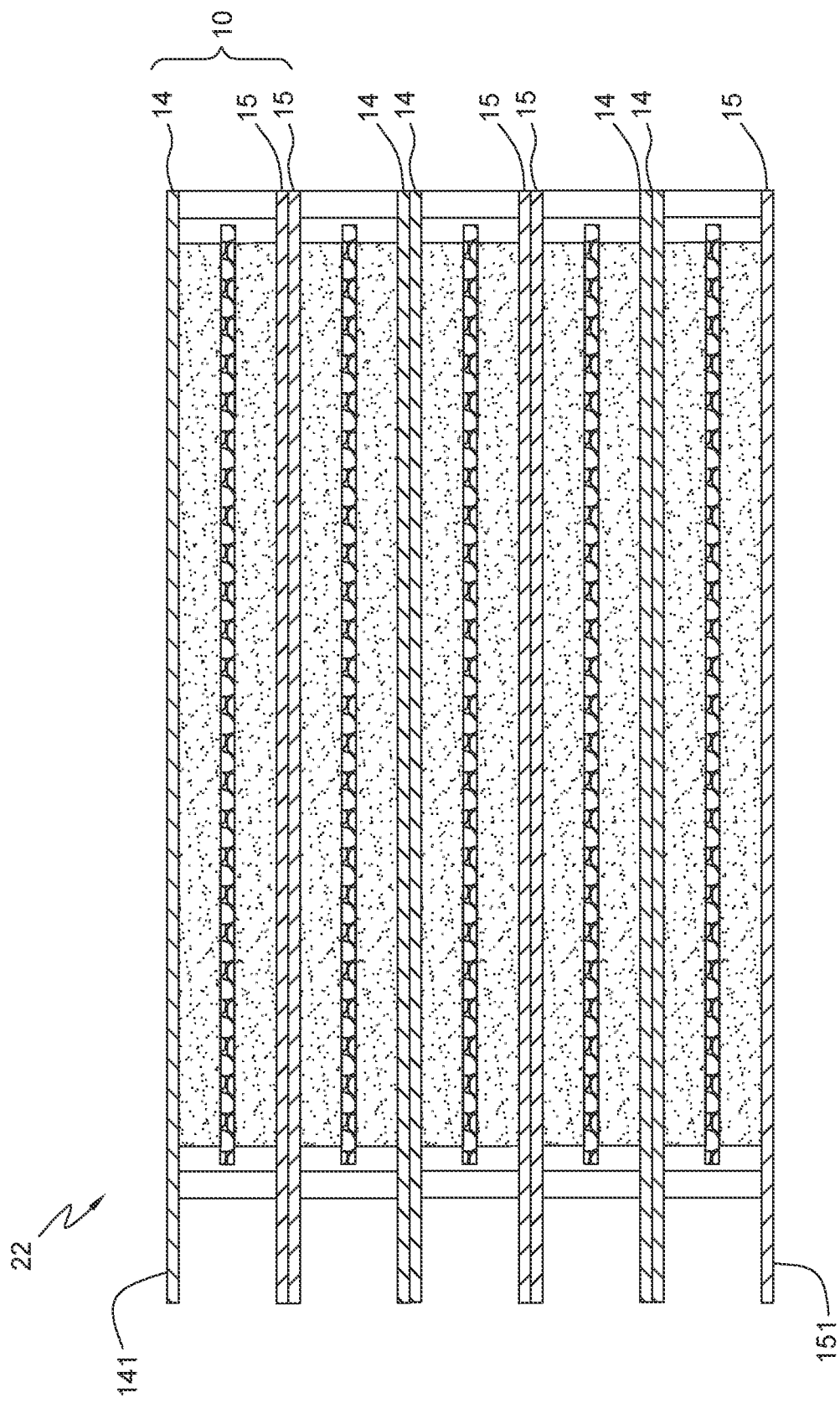
FIG. 5B illustrates the second embodiment of the electricity supply element group of the composite battery cell of this invention.

Please refer to FIG. 5B, which illustrates a second embodiment of the electricity supply element group of the composite battery cell of this invention. The electricity supply element group 22 includes a plurality of electricity supply elements 10 electrically connected to each other in parallel. Because the outermost layer of the electricity supply elements 10 is the current collectors 14, 15, the adjacent electricity supply elements may form electrically connection by direct contact of the current collectors 14, 15. The current collectors 14, 15 of the electricity supply element 10 include electrode tabs 141, 151 respectively. The electrode tabs 141, 151 with the same polarity of the electricity supply elements 10 of the electricity supply element group 22 are connected to form electrically connection in parallel, via folding to contact or welding. For example, as shown in FIG. 5B, when the current collector 14 is a positive current collector and the current collector 15 is a negative current collector, the current collector 15 of the outermost electricity supply elements 10 can directly contact the current collector 15 of the next electricity supply elements 10. Also, the current collector 14 of this electricity supply elements 10 can directly contact the current collector 14 of the next electricity supply elements 10, sequentially. Then, the electrode tabs 141, 151 are used to form electrical connection in parallel. The electricity supply element 10 serves as an independent module. The electrolyte system of each electricity supply element 10 does not circulate between the electricity supply elements 10. Therefore, charge transfer occurs between the current collectors 14, 15 of the adjacent electricity supply elements without electrochemical reactions, i.e. without ion migration and transport.

Figure 6B:
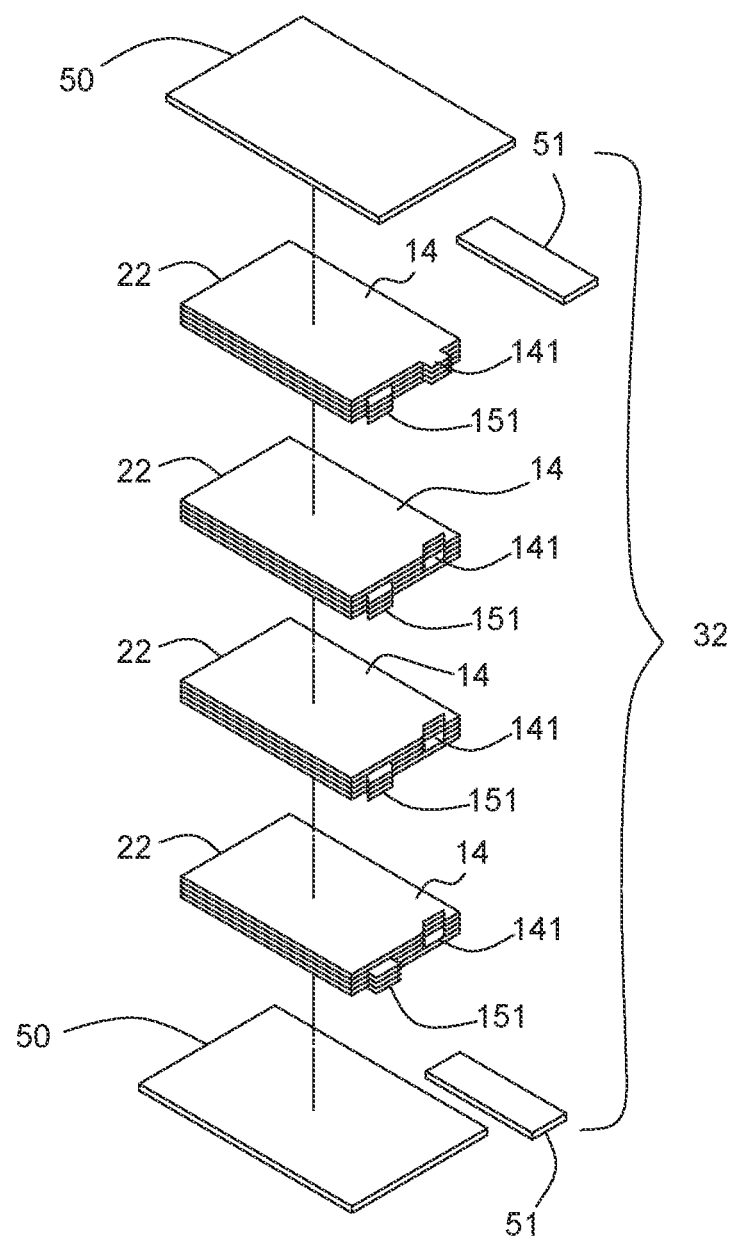
FIG. 6B illustrates the second embodiment of the composite battery cell of this invention.

Moreover, please refer to FIG. 6B, the composite battery cell 32 is formed by the electricity supply element groups 22, which is shown in FIG. 5B. Because the electricity supply element group 22 within the electricity supply elements 10 are electrically connected to each other in parallel, the composite battery cell 32 of this embodiment includes a plurality of electricity supply element groups 22 electrically connected in series. In other words, the electricity supply element groups 22 are stacked in the same orientation. The current collectors 14, 15 of the outermost electricity supply elements 10 are in direct contact with the different polarities to achieve electrical connection. The pack case 50 is used to house the electricity supply element groups 22. The pack case 50 may be a polymer film to prevent short circuit. Also, the pack case 50 may be an aluminum foil or a metal can.

The electrode tabs 141, 151 of each electricity supply element group 22 are folded to contact and electrically connect to the current collectors 14, 15 with the same polarity of the adjacent electricity supply element group 22. Only one set of the electrode tabs 141, 151 of the outermost electricity supply element group 22 is kept to connect to the conductive lead 51. After being packed, the conductive lead 51 extends to be exposed from the pack case 50 (please refer to FIG. 7). Therefore, both series and parallel connection are made within the package, i.e., the pack case 50, of the composite battery cell 32 to achieve high capacity and high voltage. It is quite different from conventional battery cell, as shown in FIGS. 1A and 1B, which can only have parallel connection within the package and have connection in series outside the battery cell to form a necessary battery system. On the other hand, the composite battery cell 32 of the present invention can serve the functions of the conventional battery system. However, because the external connections are omitted, the occupied space is decreased and the volumetric energy density is increased. Furthermore, it is convenient to manage.

Figure 8A:
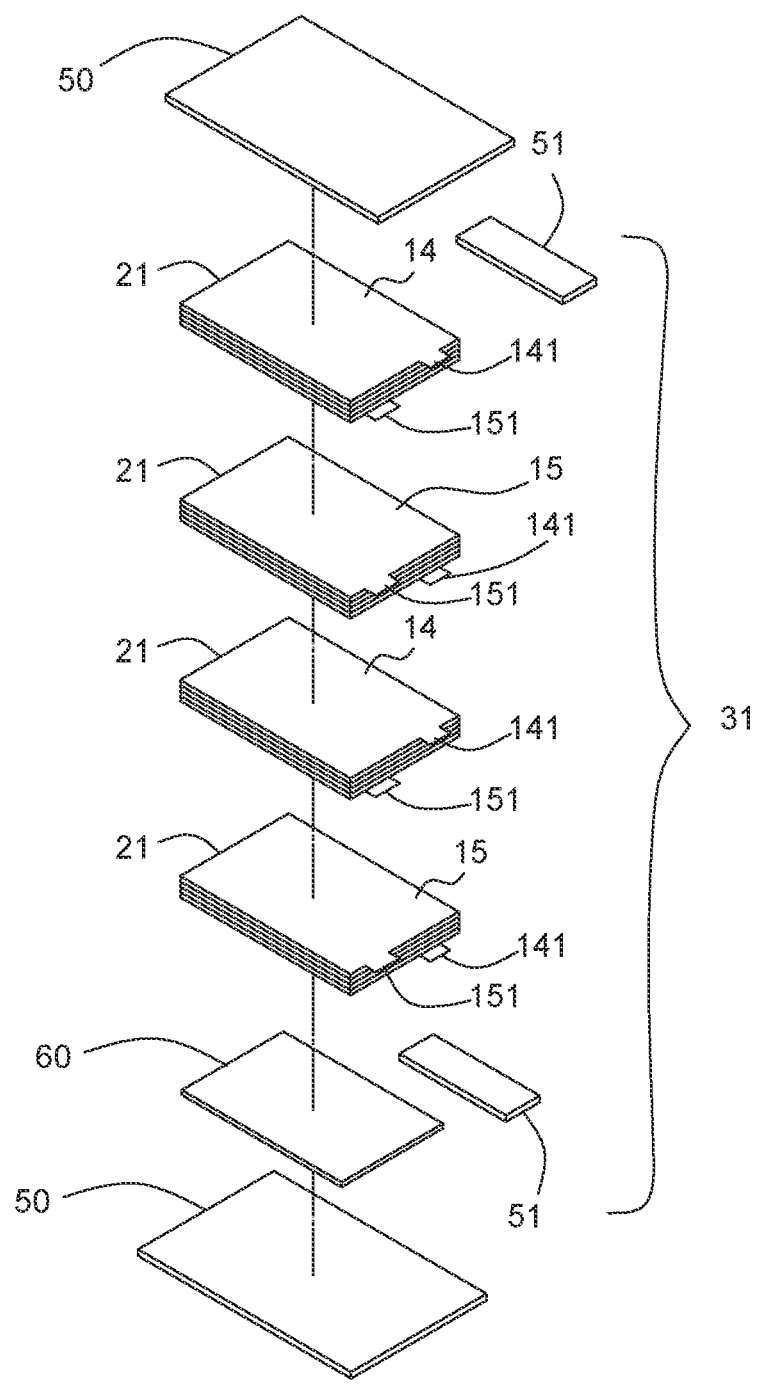
FIG. 8A illustrates the respective view of first embodiment of the composite battery cell of this invention, which integrated the PCB module into the pack case.
Figure 8B:
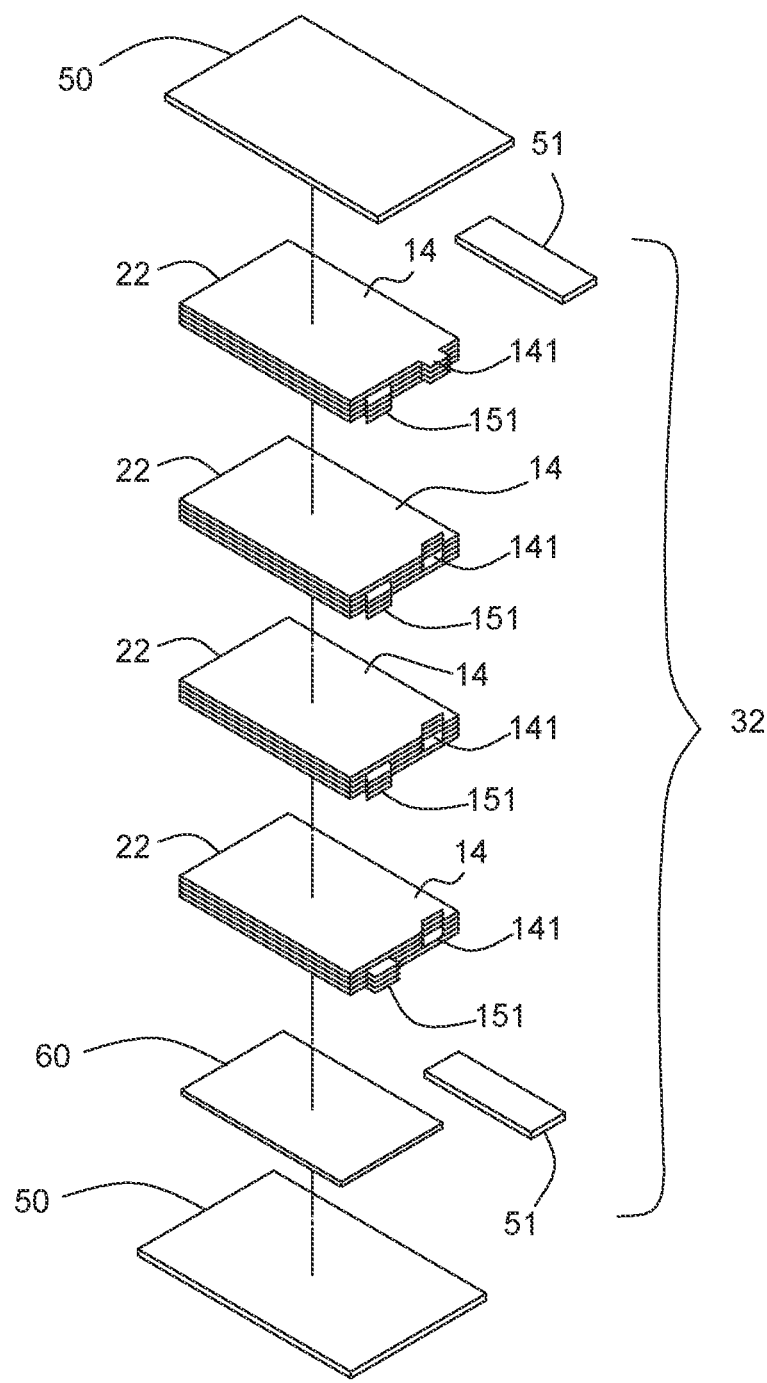
FIG. 8B illustrates the respective view of second embodiment of the composite battery cell of this invention, which integrated the PCB module into the pack case.

Also, the PCB module 60 may be packed within the pack case 50 for convenient use—please refer to FIGS. 8A and 8B. Such an external PCB module 60 may not even be necessary for the composite battery cell 31, 32. It is convenient to use and flexible to design.

Accordingly, the composite battery cell of the present invention includes a plurality of electricity supply elements connected in series/parallel to form the electricity supply element groups. The electricity supply element groups are connected in parallel/series and packed to form the battery cell with a high capacity and a high voltage. Because both series and parallel connection are made within the package of the battery cell, the external connection, in series, in parallel or the combinations, of the conventional battery cell are not necessary. Therefore, the resistance, caused by the external connection, will not be increased. The discharge performance is improved, and the reliability and safety are significantly improved.

Furthermore, because the electricity supply element serves as an independent module, the electrolyte system of each electricity supply element does not circulate between the electricity supply elements. Therefore, charge transfer occurs between the adjacent electricity supply elements without electrochemical reactions, i.e. without ion migration and transport. The electrolyte decomposition resulted from the high voltage will not occur, to improve the safety. Also, the electricity supply element group is formed by the directly contact of the current collectors of the electricity supply elements. The resistance of the whole structure is very low, and excellent charging/discharging speed and low heat generation are achieved. Therefore, the heat dissipation mechanism can be simplified. The whole system is easy to manage and control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A composite battery cell, comprising:
a plurality of electricity supply element groups electrically connected in parallel, each of the electricity supply element groups including more than two electricity supply elements electrically connected in series, each of the electricity supply elements being an independent module having an electrolyte system circulating only therein, charge transfer occurring between two of the adjacent electricity supply elements without electrochemical reactions, wherein
the electricity supply elements each have two current collectors respectively disposed on two sides thereof and extending in a first direction, adjacent current collectors of adjacent electricity supply elements being in direct contact with each other; and
only one pack case, housing the electricity supply element groups;
wherein each current collector has a body, the body has an inner surface and an outer surface, each electricity supply element further includes two active material layers, each disposed between the bodies of the two current collectors and each directly contacting the inner surface of a respective current collector body, the adjacent electricity supply elements contacting each other via direct contact of the outer surfaces of the bodies to form electrical connection connected in series;
wherein only an outermost side of an outermost current collector of an outermost electricity supply element of each electricity supply element group includes an electrode tab which is formed integrally with the body of the outermost current collector and formed by directly extending from the body of the outermost current collector such that for each electricity supply element group, only two electrode tabs having different polarities are formed, wherein the two electrode tabs are located at a same side of the electricity supply element group;
wherein the body of the outermost current collector of the outermost electricity supply element of each electricity supply element group is in direct contact with the body of an outermost current collector of an outermost electricity supply element of an adjacent electricity supply element group, to form electrical connection;
wherein each of the electricity supply elements comprises:
a sealing layer, disposed between the two current collectors and adhering to the two current collectors, the sealing layer sealing the electrolyte system between the two current collectors, the sealing layer extending in a second direction substantially perpendicular to the first direction; and
wherein the parallel electrical connection of the plurality of electricity supply element groups is achieved through stacking the electricity supply element groups inverted alternately face-up and face-down so that the current collectors of the outermost electricity supply elements directly contact each other.

2. The composite battery cell of claim 1, wherein the electrolyte system is a gel electrolyte, a liquid electrolyte, a solid electrolyte or a combination thereof.

3. The composite battery cell of claim 1, wherein the electricity supply element includes a separator having two sides, and the two active material layers have the electrolyte system impregnated therein and are disposed on respective sides of the separator.

4. The composite battery cell of claim 1, wherein connected electrode tabs of a same polarity form parallel electrical connections among the electricity supply element groups.

5. The composite battery cell of claim 1, wherein the electrode tabs of outermost two of the electricity supply elements of outermost two of the electricity supply element groups are each connected to a conductive lead.

6. The composite battery cell of claim 5, wherein the conductive lead extends to be exposed from the pack case, and the conductive leads are located at a same side of the pack case.

7. The composite battery cell of claim 5, further comprising a printed circuit board (PCB) module connected to the conductive lead and packed within the pack case.

8. The composite battery cell of claim 1, wherein the adjacent current collectors are of different polarities to form electrical connection in series.

9. The composite battery cell of claim 1, wherein the sealing layer of the electricity supply element comprises two modified silicone layer and a silicone layer disposed therebetween.

10. The composite battery cell of claim 1, wherein the pack case is a polymer film, an aluminum foil or a metal can.

11. The composite battery cell of claim 1, wherein the composite battery cell has only one of the pack case and the electricity supply elements are electrically connected both in parallel and in series within the only one of the pack case.

* * * * *